United States Patent
Jung

(10) Patent No.: US 9,685,817 B2
(45) Date of Patent: Jun. 20, 2017

(54) WIRELESS POWER CHARGING SYSTEM

(71) Applicant: Intel Corporation, Santa Clara, CA (US)

(72) Inventor: Chun-Kil Jung, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/046,335

(22) Filed: Feb. 17, 2016

(65) Prior Publication Data

US 2016/0164338 A1 Jun. 9, 2016

Related U.S. Application Data

(63) Continuation of application No. 12/147,071, filed on Jun. 26, 2008, now abandoned.

(30) Foreign Application Priority Data

Nov. 30, 2007 (KR) ........................ 10-2007-0123750

(51) Int. Cl.
*H02J 7/02* (2016.01)
*H02J 50/12* (2016.01)
(Continued)

(52) U.S. Cl.
CPC ................ *H02J 7/025* (2013.01); *H02J 7/04* (2013.01); *H02J 50/12* (2016.02);
(Continued)

(58) Field of Classification Search
USPC ....................................................... 320/108
See application file for complete search history.

(56) References Cited

U.S. PATENT DOCUMENTS 5,157,319 A 10/1992 Klontz et al.
5,596,261 A 1/1997 Suyama
(Continued)

FOREIGN PATENT DOCUMENTS

JP 2006141170 6/2006
JP 2006517378 7/2006
(Continued)

OTHER PUBLICATIONS

Extended European Search Report dated Oct. 10, 2012, issued in corresponding European Application No. 08159326.1-2207/2066000.
(Continued)

*Primary Examiner* — Samuel Berhanu
(74) *Attorney, Agent, or Firm* — International IP Law Group, P.L.L.C.

(57) ABSTRACT

A wireless power charging system has a wireless power transmission apparatus formed to charge a plurality of wireless power receiving apparatuses located in a short distance therefrom, wherein the total charging time for the wireless power receiving apparatuses is saved. The wireless power transmission apparatus has a main control unit and a resonant converter unit, which transmit the electric signal to the wireless power receiving apparatus via the resonance signal generated from a primary charge core in order to charge the wireless power receiving apparatuses. The wireless power transmission apparatus also includes an output signal conversion module for transmitting a converted electric signal to the resonant converter unit and a received signal process module for processing a signal transmitted from the wireless power receiving apparatus.

15 Claims, 4 Drawing Sheets

(51) Int. Cl.
*H02J 7/04* (2006.01)
*H02J 7/00* (2006.01)

(52) U.S. Cl.
CPC ............ *H02J 2007/0001* (2013.01); *H02J 2007/0096* (2013.01); *Y02B 40/90* (2013.01)

(56) References Cited

U.S. PATENT DOCUMENTS

| | | |
|---|---|---|
| 5,898,234 A | 4/1999 | Kitagawa |
| 6,184,651 B1 | 2/2001 | Fernandez |
| 6,522,100 B2 | 2/2003 | Hansford |
| 6,992,462 B1 | 1/2006 | Hussaini |
| 2004/0145342 A1 | 7/2004 | Lyon |
| 2005/0068019 A1 | 3/2005 | Nakamura et al. |
| 2005/0127867 A1 | 6/2005 | Calhoon et al. |
| 2005/0189910 A1 | 9/2005 | Hui |
| 2007/0024235 A1 | 2/2007 | Guthrie |
| 2007/0182367 A1 | 8/2007 | Partovi |
| 2008/0169706 A1 | 7/2008 | Onishi |

FOREIGN PATENT DOCUMENTS

| | | |
|---|---|---|
| JP | 2007089341 A | 4/2007 |
| JP | 2007190288 | 8/2007 |
| KR | 100554554889 B1 | 3/2006 |
| KR | 100649592 | 11/2006 |
| KR | 20070014804 A | 2/2007 |
| WO | 2006001557 A1 | 1/2006 |
| WO | 2007008646 | 1/2007 |
| WO | 2009014125 A1 | 1/2009 |

OTHER PUBLICATIONS

Kurs, A. et al.; "Wireless Power Transfer via Strongly Coupled Magnetic Resonances", Science 317, 83 (2007). American Association for the Advancement of Science, Washington, DC.

WIRELESS POWER CHARGING SYSTEM

CLAIM OF PRIORITY

This application is a continuation of U.S. patent application Ser. No. 12/147,071 filed Jun. 26, 2008 which claims the benefit of Korean Patent Application No. 10-2007-0123750 filed on Nov. 30, 2007, in the Korean Intellectual Property Office, the disclosure of which is incorporated herein by reference.

BACKGROUND OF THE INVENTION

Field of the Invention

The present invention relates to a wireless power charging system, and more particularly, to a short-distance wireless power charging system, which has a wireless power transmission apparatus formed to charge a plurality of wireless power receiving apparatuses located in a short distance therefrom, wherein the total charging time for a plurality of wireless power receiving apparatuses can be saved.

Description of the Related Art

Portable electronic devices, such as cellular phones, personal digital assistants (PDAs), portable media players (PMPs), digital multimedia broadcasting terminal (DMB terminals), MPEG audio layer 3 (MP3) players or notebook computers, cannot be plugged into the regular power at home or office since they are generally used while the users are moving. Accordingly, the portable electronic devices are equipped with batteries or rechargeable batteries.

A charging system has been used to charge electric power, supplied from a regular power source, to the batteries or a battery pack of the portable devices via power supply lines or power supply connectors. However, when the charger and the batteries are connected or disconnected to replenish the electric power of the batteries with this connector supply system, an instant discharge may happen because of the potential differences between the charger connector and the battery connector. Hence the foreign substances will be gradually gathered on both connectors and finally there may be a fire disaster. Further, the collected humidity thereon will cause the discharge of the battery and other problems will be involved like the declining battery life, the low battery quality, and so on.

To solve the above-mentioned problems of the charging system using the power supply connectors, non-contacting charging systems have been developed. In this non-contacting charging system in accordance with the prior art, the device having the battery to be charged is placed over the primary coil of the non-contacting charging system and the battery will be charged by the secondary coil of the battery. The battery is charged with the induced electricity from the induced electromotive force of the secondary coil by the generated magnetic field from the primary coil.

The conventional non-contacting charging systems with the prior art can only be used to supply the electricity to the portable devices. There are limited practical uses because they cannot be used in various alternatives.

Besides, if a metal is placed inside the effective radius of the generated magnetic field of the primary coil, there would be a lot loss of the electricity in the primary coil and non-contacting charging system may be damaged.

SUMMARY OF THE INVENTION

To solve the above-mentioned problems, the present invention is directed to a wireless power charging system formed to charge a plurality of wireless power receiving apparatuses placed in a short distance from a wireless power transmission apparatus, wherein the total charging time for a plurality of wireless power receiving apparatuses will be saved.

Moreover, when a plurality of wireless power receiving apparatuses are fully charged, the wireless power transmission system will be automatically changed to a standby mode, wherein the initial pulse signal is sending out. By doing so, the charging efficiency will be maximized while the loss of the electricity will be minimized.

According to an aspect of the present invention, there is provided a wireless power charging system for charging one or a plurality of wireless power receiving apparatuses in a short distance from a wireless power transmission apparatus. The wireless power transmission apparatus includes a power transmission apparatus case as an outside body housing a main control unit and a resonant converter unit, which transmit an electric signal to one or via a resonance signal generated from a primary charge core; an output signal conversion module for transmitting the converted electric signal to the resonant converter unit by the control signal from the main control unit; and a received signal process module, which processes a signal transmitted from the wireless power receiving apparatus via the primary charge core and sends the processed signal out to the main control unit.

Hereupon the resonant converter unit may include an R-L-C series-parallel resonant converter.

The power transmission apparatus case may include a power on/off switch on the front side thereof; an input panel for signal input; and a display panel showing the charging status of the wireless power receiving apparatus and normal/abnormal status of the wireless power transmission apparatus. The power transmission apparatus further includes a power supply unit installed inside the power transmission apparatus case.

The main control unit may include a power supply block connected with the power supply unit for the power supply to the wireless power transmission apparatus; a signal output block for sending the display signal to show the status on a display panel; a gate output signal process block coupled with an output signal conversion module for transmitting a power signal transferred from the primary charge core; a received signal process block for processing a signal transmitted from a received signal process module, which processes the signal transmitted from the wireless power receiving apparatus; and a main controller which controls the power supply block, the signal output block, the gate output signal process block, and the received signal process block.

Furthermore, the wireless power receiving apparatus may include a secondary charge core fronting the primary charge core of the wireless power transmission apparatus in order to receive the power signal via the resonant with the magnetic field; a received power signal conversion module connected with the secondary charge core for converting the received power signal; a charge circuit block linked with the received power signal conversion module in order to charge the battery cell; a protection circuit block formed between the charge circuit block and the battery cell for detecting the charged current into the battery cell and sending the charging status of the battery cell to the wireless device control module; a voltage regulator block for the power supply to the wireless device control module; and a wireless device control module, which controls the received power signal conversion module, the charge circuit block, the protection circuit block, and the voltage regulator block.

The present invention formed with the above-mentioned figures is constructed to charge a plurality of wireless power receiving apparatuses located in a short distance from the wireless power transmission apparatus, wherein the advantageous effect is that the total charging time for a plurality of wireless power receiving apparatuses can be saved.

Moreover, when a plurality of wireless power receiving apparatuses are fully charged, the wireless power transmission system will be changed to a stand-y mode where the initial pulse signal is sending out. By doing so, the charging efficiency will be maximized while the loss of electric power will be minimized.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The invention will now be described in detail with reference to the accompanying drawings.

Figure 1:
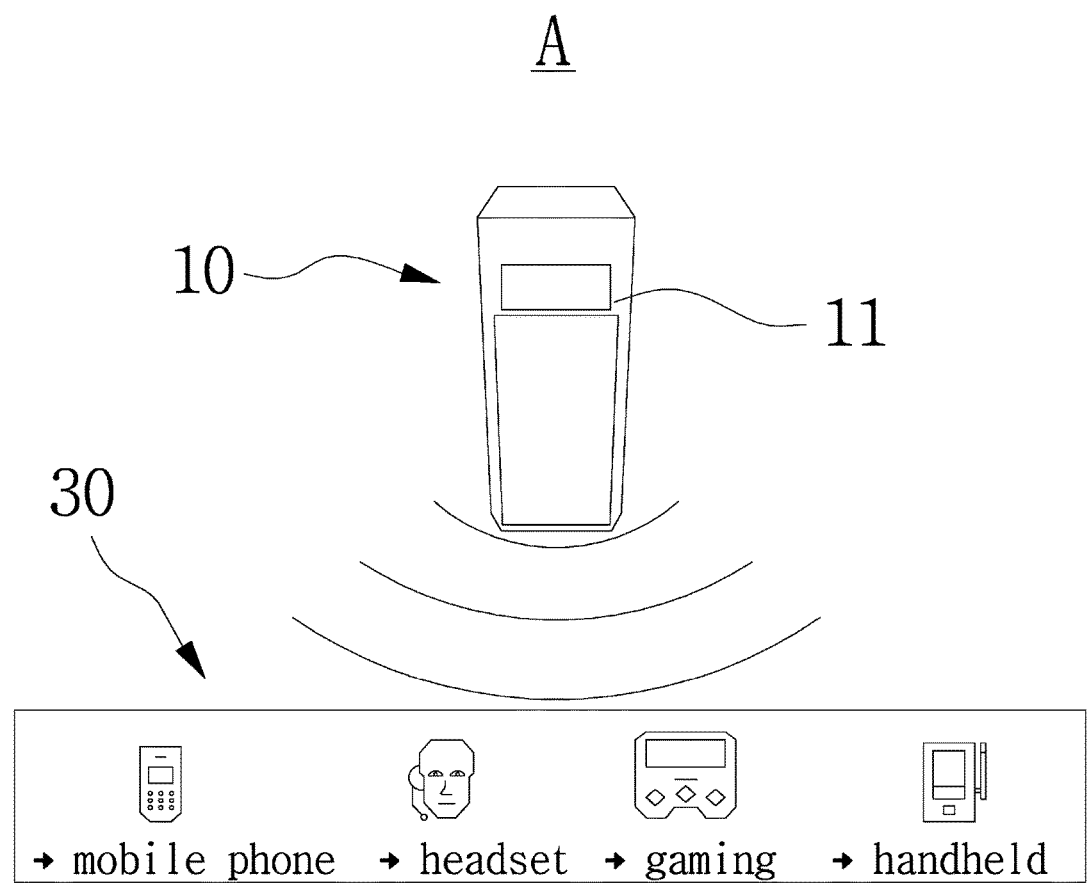
FIG. 1 is a schematic configuration view of a wireless power charging system in accordance with the present invention.
Figure 2:
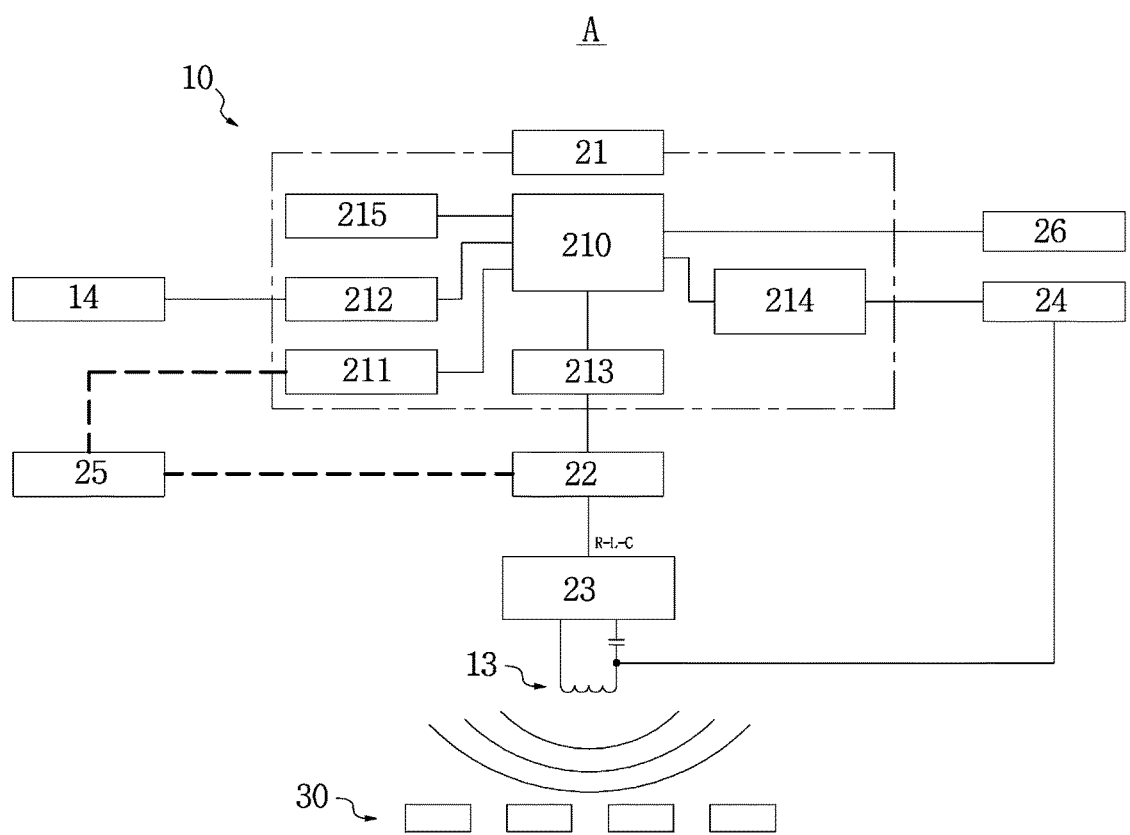
FIG. 2 is a block diagram of a wireless power transmission apparatus in accordance with the present invention.
Figure 3:
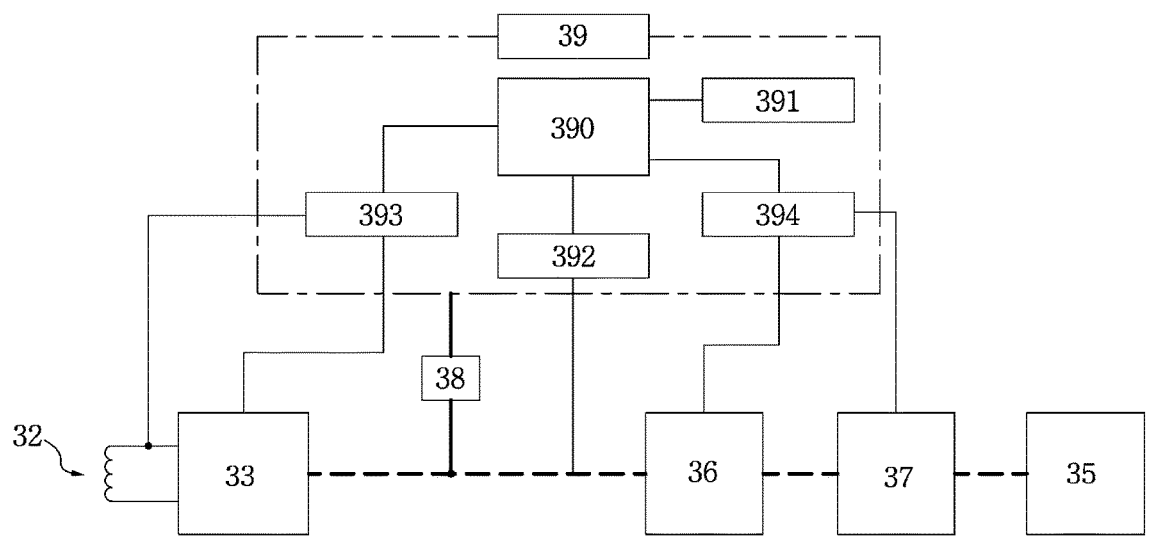
FIG. 3 is a block diagram of a wireless power receiving apparatus according to the present invention.
Figure 4:
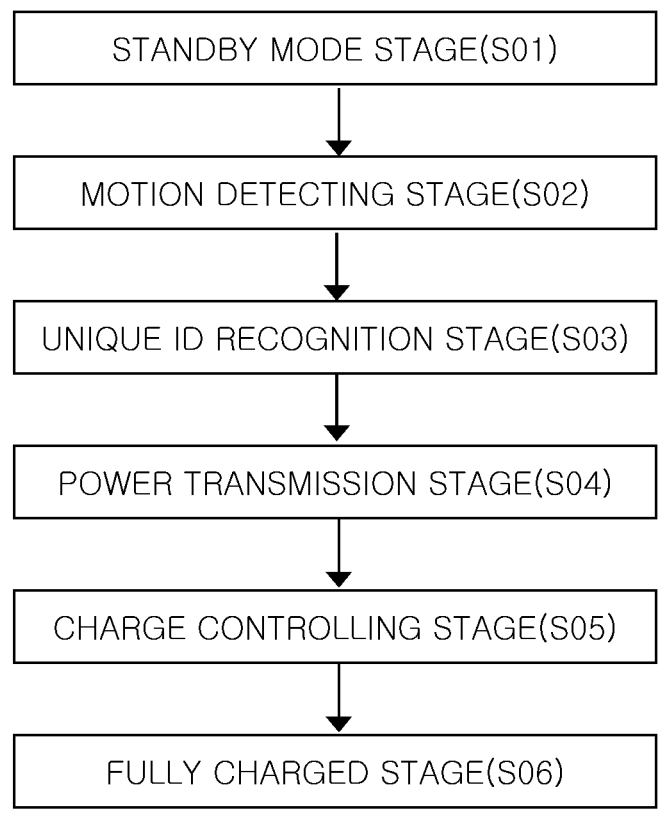
FIG. 4 is a flow diagram of a conceptual transmission control process for the wireless power charging system in accordance with the present invention.

FIG. 1 is a schematic configuration view of a wireless power charging system in accordance with the present invention, FIG. 2 is a block diagram of a wireless power transmission apparatus in accordance with the present invention, FIG. 3 is a block diagram of a wireless power receiving apparatus according to the present invention, and FIG. 4 is a flow diagram of a conceptual transmission control process for the wireless power charging system in accordance with the present invention.

Referring to FIGS. 1 to 4, a wireless power charging system A is formed with a wireless power transmission apparatus 10 to transmit the power signal for charging one or a plurality of wireless power receiving apparatuses 30 located in a short distance from the wireless power transmission apparatus 10.

The wireless power transmission apparatus 10 includes a power transmission apparatus case 11 as an outside body, housing therein a main control unit 21 and a resonant converter unit 23, which transmit an electric signal to the wireless power receiving apparatus 30 via a primary charge core 13; an output signal conversion module 22 for transmitting a converted electric signal to the resonant converter unit 23 by a control signal from the main control unit 21; and a received signal process module 24, which processes a signal transmitted from the wireless power receiving apparatus 30 via the primary charge core 13 and sends the processed signal out to the main control unit 21.

The resonant converter unit 23 includes an R-L-C series-parallel resonant converter. As shown in FIG. 1, the magnetic field is generated according to the electromagnetic resonance by the resonant converter unit 23 and the primary charge core 13. With this process, the power signal is ready to be sent to the wireless power receiving apparatuses 30 located in a short distance from the wireless power transmission apparatus 10.

The power transmission apparatus case 11 (of the power transmission apparatus 10) includes a power on/off switch on the front side thereof; an input panel for signal input; and a display panel 14 showing the charging status of the wireless power receiving apparatus 30 and normal/abnormal status of the wireless power transmission apparatus 10. Inside the power transmission apparatus case 11, a power supply unit 25 is installed. Therefore, the operator can use the wireless power charging system A according to the displayed messages on the display panel 14 of the wireless power transmission apparatus 10.

The main control unit 21 of the wireless power transmission apparatus 10 may include a power supply block 211 coupled with the power supply unit 25 for the power supply to the wireless power transmission apparatus 10; a signal output block 212 for sending the signal to show the status on a display panel 14; a gate output signal process block 213 coupled with a output signal conversion module 22 for transmitting the transferred power signal from the primary charge core 13; a received signal process block 214 for processing the transmitted signals from a received signal process module 24 which processes the transmission signal from the wireless power receiving apparatus 30; and a main controller 210 which controls the power supply block 211, the signal output block 212, the gate output signal process block 213, and the received signal process block 214.

Furthermore, the wireless power receiving apparatus 30 may include a secondary charge core 32 fronting the primary charge core 13 of the wireless power transmission apparatus 10 in order to receive the power signal via the resonant with the magnetic field; a received power signal conversion module 33 connected with the secondary charge core 32 for converting the received power signal; a charge circuit block 36 linked with the received power signal conversion module 33 in order to charge the battery cell 35; a protection circuit block 37 formed between the charge circuit block 36 and the battery cell 35 for detecting the charged current into the battery cell 35 and sending the charging status of the battery cell 35 to the wireless device control module 39; a voltage regulator block 38 for the power supply to the wireless device control module 39; and a wireless device control module 39 which controls the received power signal conversion module 33, the charge circuit block 36, the protection circuit block 37, and the voltage regulator block 38.

The wireless power receiving apparatus 30 can be included inside the portable electronic devices, for example, cellular phones, PDAs, PMPs, DMB terminals, MP3s or notebook computers.

With the wireless power charging system A, the power signal can be transmitted to the secondary charge core 32 of the wireless power receiving apparatus 30 by the resonance signals according to the electric field and magnetic field transferred from the primary charge core 13 although the wireless power receiving apparatus 30 is several meters apart from the wireless power transmission apparatus 10.

The secondary charge core 32 of the wireless power receiving apparatus 30 collects the power signals, which are the resonant signals by the electric field and magnetic field, and can be made of the materials like titanium dioxide ($TiO2$, dielectric constant 96), barium tetratitanate ($BaTi4O9$, dielectric constant 37), and lithium tantalite ($LiTaO3$, dielectric constant 40).

For the secondary charge core 32 corresponding to a power receiving antenna for the resonant signals, it is better to use the materials with the small loss according to the dielectric constant.

The wireless power charging system A with above-mentioned figures in accordance with the present invention is to transmit the power signal, as the resonant signal by the electric field and the magnetic field, to one or a plurality of wireless power receiving apparatuses 30. It is an advantage that the charging operation is still possible despite the increased or decreased numbers of the wireless power receiving apparatuses 30, even though the wireless power transmission apparatus 30 is sending out the same amount of the resonant signals.

If there is no wireless power receiving apparatus 30 in the near area; the power receiving apparatus 30 is placed in close proximity and starts being charged for the first time; or a changed condition happens like one or a plurality of wireless power receiving apparatuses 30 are fully charged and charging is stopped, the wireless power charging system A needs to be designed to transfer these information to the wireless power transmission apparatus 10 which operates properly in accordance with the received information.

As shown in FIG. 4, the wireless power charging system A will be changed to a standby mode stage S01, in which the charging operation will be stopped if there is no wireless power receiving apparatuses 30 near the wireless power transmission apparatus 10. At the standby mode stage S01, this system is regularly sending out the pulse signal by the predetermined cycle and detects if any wireless power receiving apparatuses 30 are approaching within several meters. When any approaching wireless power receiving apparatuses 30 are detected within several meters, the system will start sending out the charging power.

Before sending out the charging power, the system will perform a motion detecting stage S02 at first to check if the approaching objects are properly working wireless power receiving apparatuses 30.

In the standby mode stage S01, together with the pulse signal, the system will send out the signal asking for the unique ID data signal of the wireless power receiving apparatus 30. Next step is to perform a unique ID recognition stage S03 to recognize if the wireless power receiving apparatus 30 is the proper one for the charging operation with the received signal from the wireless power receiving apparatus 30.

When it is recognized as a properly working wireless power receiving apparatus 30 with a properly recognized unique ID, the system will start working the charging operation in a power transmission stage S04.

During the power transmission stage S04, the system can send out a unique code as an initial signal. This unique code is to recognize the status of the charged power and the condition of the equipment for every wireless power receiving apparatus 30 when a plurality of wireless power receiving apparatuses 30 are connected and being charged with the wireless power charging system A at the same time. The data value of the unique ID for each wireless power receiving apparatus 30 can be changed to a code value and this code value can be used for sending/receiving data for the unique ID of the wireless power receiving apparatus 30 instead.

When a plurality of wireless power receiving apparatuses 30 are connected and being charged at the same time, the system can be adapted to send out each status of the charged power and the condition of the equipment for every wireless power receiving apparatus 30 and control the charging amount at each charging stage in a charge controlling stage S05.

When a wireless power receiving apparatus 30 is fully charged according to the status of the charged power, the charging operation is controlled to stop working although the specific power signal for the wireless power receiving apparatus 30 is received.

When all the wireless power receiving apparatuses 30 are fully charged, a fully charged stage S06 will be performed to stop working the wireless power transmission apparatus 10.

Hence, the wireless power charging system A stops working the charging operation. The system is changed to the standby mode stage S01 and the wireless power transmission apparatus 10 is continuously sending out the pulse signal to detect another wireless power receiving apparatus 30 to be charged.

While the present invention has been shown and described in connection with the preferred embodiments, it will be apparent to those skilled in the art that modifications and variations can be made without departing from the spirit and scope of the invention as defined by the appended claims.

What is claimed is:

1. An apparatus for wirelessly transmitting power to a power receiving apparatus, comprising:
 a primary coil configured to periodically transmit a pulse signal to detect presence of an object and further configured to transmit a resonant signal to the object;
 a resonant converter unit configured to convert a power signal to the resonant signal and further configured to transmit the resonant signal to the object via the primary coil;
 a controller configured to:
  receive information from the object through the primary coil in response to the transmitted pulse signal;
  determine whether the object is capable to receive power wirelessly based on the information received from the object in response to the transmitted pulse signal, wherein the information received from the object comprises a unique identifier of the object;
  in response to a determination that the object is capable to receive power wirelessly, transmit the resonant signal to the object in a power transmission stage;
  during the power transmission stage, receive a charge status from the object through the primary coil; and
  determine whether to continue to transmit the resonant signal to the object based on the received charge status of the object.

2. The apparatus of claim 1, further comprising an output signal conversion module configured to transmit the power signal to the resonant converter unit under the control of the controller.

3. The apparatus of claim 1, wherein the controller is configured to control the resonant signal based on the information received from the object.

4. The apparatus of claim 1, wherein the controller is configured to stop the transmission of the resonant signal if the received charge status indicates that the object is fully charged.

5. The apparatus of claim 4, wherein the controller is configured to re-transmit the pulse signal through the primary coil after stopping the transmission of the resonant signal.

6. The apparatus of claim 1, further comprising a display unit configured to display charging status information.

7. The apparatus of claim 6, wherein the display unit is configured to display whether the power transmission is abnormal.

8. The apparatus of claim 1, wherein the resonant signal is a magnetic field according to a predetermined electromagnetic resonance for transmission of the power signal to the object located several meters apart from the primary coil.

9. A method of operating a wireless power transmitter, comprising:
   periodically transmitting a pulse signal via a primary coil to detect presence of an object;
   receiving information from the object in response to the transmitted pulse signal;
   determining whether the object is capable to receive power wirelessly based on the information received from the object in response to the transmitted pulse signal, wherein the information received from the object comprises a unique identifier of the object;
   converting a power signal to the resonant signal and transmitting the resonant signal to the object through the primary core in a power transmission stage if the object is determined to be capable to receive power wirelessly;
   during the power transmission stage, receiving a charge status from the object through the primary coil; and
   determining whether to continue to transmit the resonant signal to the object based on the received charge status of the object.

10. The method of claim 9, wherein the resonant signal is controlled based on the data signal of the object.

11. The method of claim 9, further comprising stopping power transmission if the status of the charged power indicates that the charging operation is completed or the object is fully charged.

12. The method of claim 9, further comprising re-transmitting the pulse signal after stopping the transmission of the resonant signal.

13. The method of claim 9, further comprising displaying the charging status information on a display unit disposed on a housing of the wireless power transmitter.

14. The method of claim 13, wherein the display unit is configured to display whether the transmission of the resonant signal is abnormal.

15. The method of claim 9, wherein transmitting the resonant signal comprises transmitting a magnetic field according to a predetermined electromagnetic resonance for transmission of the power signal to the object located several meters apart from the primary coil.

* * * * *